UNITED STATES PATENT OFFICE.

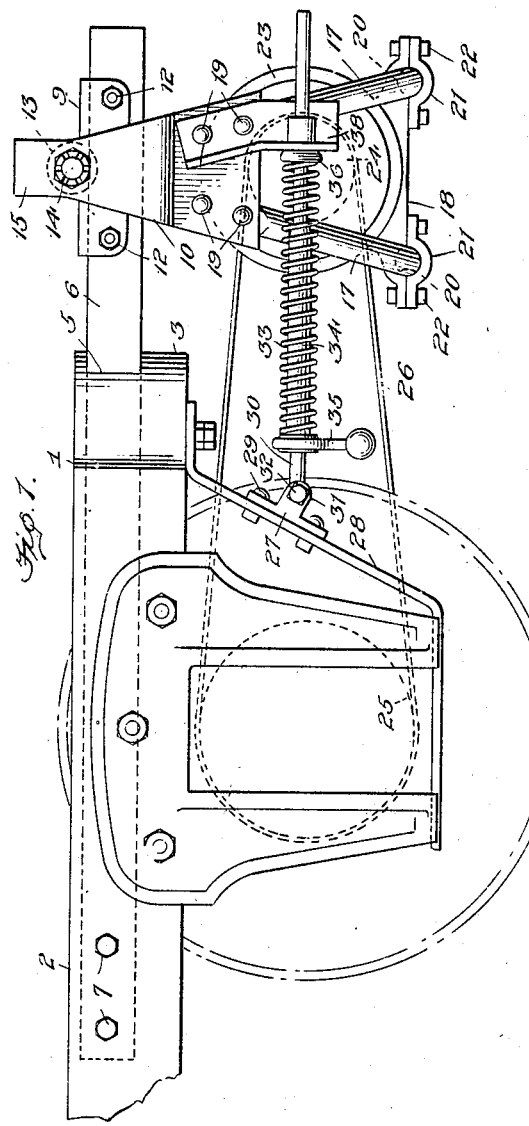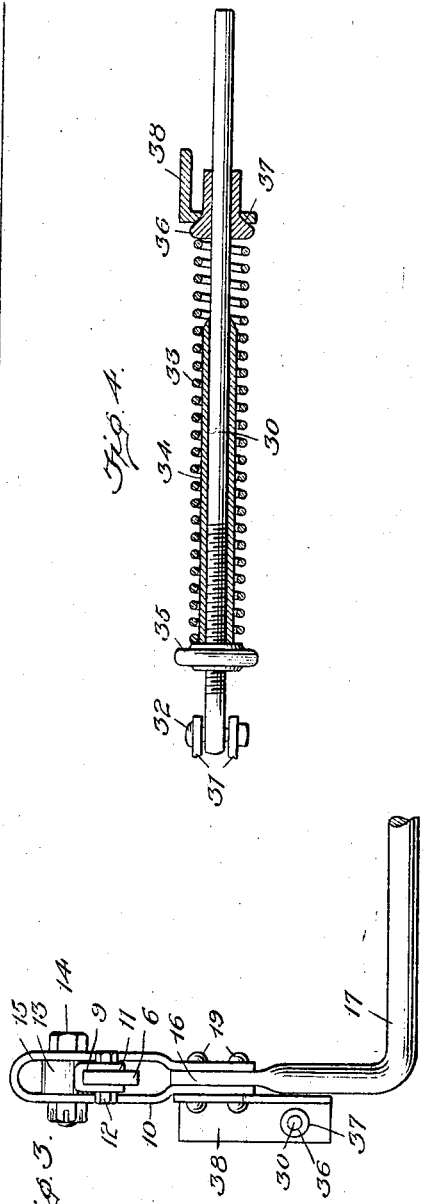

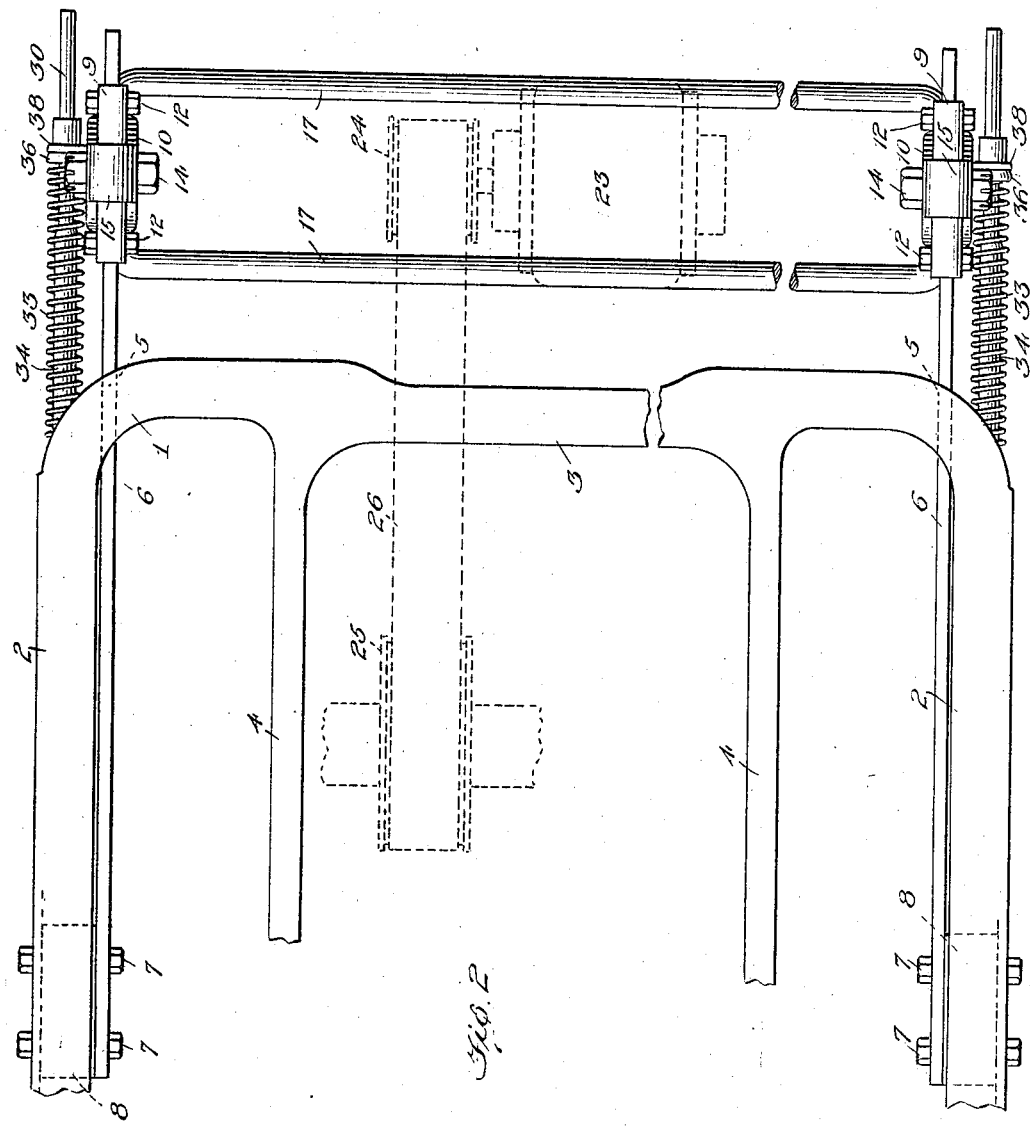

CHARLES H. QUINN, OF ROANOKE, VIRGINIA.

CAR-AXLE-DRIVEN DYNAMO.

1,376,901.  Specification of Letters Patent.  Patented May 3, 1921.

Application filed November 18, 1919. Serial No. 338,863.

*To all whom it may concern:*

Be it known that I, CHARLES H. QUINN, a citizen of the United States, residing at Roanoke, in the county of Roanoke and State of Virginia, have invented certain new and useful Improvements in Car-Axle-Driven Dynamos; and I do hereby declare the following to be a full, clear, and exact description of the invention, such as will enable others skilled in the art to which it appertains to make and use the same.

The invention relates to car axle driven dynamos and more particularly to that type of dynamo which is pivotally supported from a truck frame and which is operatively connected to a car axle by means of a belt.

The principal object of my invention, generally stated, is to provide an adjustable tensioning mechanism for use in connection with the type of dynamo described above, the said tensioning mechanism being located outside of the planes of the truck we use.

Another object of the invention is to provide a pivotally hung dynamo or generator with a belt tensioning mechanism located clear of obstructions and foreign objects which may lie between the rails of the track.

Still another object is to provide a pivotally supported dynamo or generator with a belt tensioning mechanism so located with reference to the generator that the lever arm between the point of application of the spring tension and the pivotal point of the generator may be varied to suit any type of spring mechanism.

Another object of the invention is to provide a pivotally supported belt driven dynamo with tensioning means, the said means being located in a plane passing through the center of the car axle and the center of the dynamo pulley and being positioned outside of the planes of the car or truck wheels.

There are other objects of my invention as will appear hereinafter in connection with a more detailed description of the single embodiment of the invention which has been illustrated in the accompanying drawing and in which:

Figure 1 is a fragmentary view in side elevation showing the invention applied to a pivotally supported dynamo or generator.

Fig. 2 is a top plan view of the structure illustrated in Fig. 1, the dynamo and connecting part being shown by dotted lines.

Fig. 3 is a view in front elevation of one end of the generator or dynamo cradle showing the position of the same with reference to its support and the bracket for the tension rod and spring, and Fig. 4 is a view partially in section of one of the tensioning devices.

Throughout the specification and drawings like parts are designated by like reference characters.

The numeral 1 designates generally the frame of the truck primarily designed for passenger cars, the said frame may be and preferably is provided with side members 2, 2, end members 3 (only one being shown) and intermediate members 4, 4. Adjacent the side members, the end members 3 are preferably slotted as at 5 to afford openings for the passage of rectangular bars 6 which support the generator or dynamo cradle hereinafter described. The inner ends of the bars 6 are suitably connected to the side members 2—2 by means of the bolts 7. To maintain the bars in parallel relation with the side members and to avoid bending the said bars I preferably interpose blocks 8, 8, between each bar and the adjacent side frame member. To the outer end of each bar 6 is connected a saddle or pivot member 9 for the cradle hangers 10. The said saddles are bifurcated as shown at 11 so as to straddle the adjacent bar 7 to which they are firmly and preferably adjustably connected by the bolts 12. Each saddle is provided with a pivot bearing 13 which is adapted to coöperate with a pivot pin or stud 14 carried by the coöperating hanger 10.

The said hangers are each preferably formed from a single piece of metal and are bent to form a loop or eye 15, the upper portion of which is suitably formed to receive the said pivot pin 14. The lower portions of the hanger are spaced apart a slight distance to receive the flattened ends 16 of the bars 17 which extend under and form the support for the dynamo base 18. The ends 16 of the said bars are firmly connected to the adjacent hanger 10 by the rivets 19 and it will be observed that the said ends of the bars are inclined to the vertical so that the points of connection thereof are on a radius struck from the pin 14 as a center. By this construction I am enabled to widely separate the transversely extending portions of the bars 17 without materially increasing the width of the hangers 10 and by connecting the ends in the manner described practically relieve the bar 17 from torsional strains.

The dynamo base 18 is provided with undercut recesses 20 to receive the rods 17 and the said base is firmly clamped to the rods by the clips 21 and the bolts 22. The dynamo 23 is provided with a belt pulley 24, the latter being operatively connected to the axle pulley 25 through the belt 26.

Since the belt tensioning mechanism is merely duplicated on opposite sides of the cradle, it will be only necessary for a complete understanding of the device to describe one of the tensioning devices. The said mechanism preferably comprises a pivot bracket 27 connected to the outer face of the pedestal brace 28 of the truck, by means of the bolts 29; a threaded tension rod 30 which is pivotally connected to the spaced perforated ears 31 of the said bracket 27 by means of the bolt or pin 32; a tension spring 33 which surrounds the rod 30 and fits over the rod sleeve 34, the said spring being adapted to bear at one end against the weighted adjusting nut 35 and at its opposite end against the spring seat or thimble 36, the latter being splined on the tension rod and being adapted to fit within an opening 37 formed in the cradle bracket 38. The said bracket is preferably formed as an angle bar and is riveted to the outer face of the hanger 10 and may be bent as shown so as to bring the opening 37 therein in horizontal alinement with the opening in the ear of the bracket 27. By changing the point of attachment of the bracket 38, the lever arm for the spring tensioning device may be lengthened or shortened as desired so as to accommodate any of the different types of tensioning springs. The points of connection between the brackets 27 and 38 and the tensioning rod are preferably located in the horizontal plane which passes through the centers of the car axle and the dynamo pulley.

By utilizing the pedestal braces as the points of attachment for the spring tensioning device I shorten the overall length of the truck and generator, thereby adding greatly to the life of the generator, since the swinging of the truck when a car passes around a curve does not cause portions of the generator mechanism to extend beyond the car line into a position to engage objects outside the tracks. By locating the tensioning mechanism outside of the planes of the truck or car wheels it is unnecessary for the mechanic to go between the wheels to adjust the mechanism. All portions of the tensioning mechanism being located outside of the wheels, all danger to the mechanic is avoided.

Having now fully described my invention what I claim and desire to secure by Letters-Patent is:

1. In a car truck, the combination with a pivotally supported cradle, of a dynamo connected to said cradle, means for operatively connecting the dynamo to the truck axle, and means positioned between the truck and cradle and outside of the truck wheels for maintaining the said connecting means under tension.

2. In a car truck, the combination with a cradle pivotally supported from the said truck, of a dynamo connected to said cradle, means for operatively connecting the dynamo to one of the truck axles and a plurality of means located outside of the planes of the truck wheels and positioned between the said truck and cradle for maintaining the connecting means under tension.

3. In a car truck, the combination with a pivotally supported cradle, of a dynamo connected thereto, means for operatively connecting said dynamo to the axle of the said truck, and means interposed between a pedestal brace and the said cradle for maintaining the said connecting means under tension.

4. In a car truck, the combination with a pair of cradle supporting bars rigidly connected to the said truck, of a cradle pivotally supported from the said bars, said cradle comprising a pair of hangers each adapted to be pivotally supported on one of the said bars and dynamo supporting means extending between and connected to the said hangers, a dynamo mounted on the said cradle, means for connecting said dynamo to an axle of the said truck, and means for maintaining said connecting means under tension, said last named means being interposed between the truck pedestal brace and a bracket connected to the outer face of the cradle hanger.

5. A cradle for a car axle driven dynamo, comprising a pair of loop-shaped hangers and a pair of members connected to the hangers each having upwardly extending converging ends, the said converging ends intersecting in a common center line.

6. A cradle for a car axle driven dynamo adapted to be rotatably mounted on supports carried by a car truck, said cradle comprising a plurality of rigid hangers overlying said supports, and a pair of separated members, having radially extending ends adapted to be connected to the said hangers in the vertical planes of said supports.

7. A cradle for a car axle driven dynamo adapted to be rotatably mounted on supports carried by a car truck, said cradle comprising a plurality of hangers each adapted to straddle one of said supports and a plurality of U-shaped members, the last named members having their upwardly extending ends connected to the said hangers, said ends downwardly diverging from the center of rotation of the said hangers.

8. A cradle for a car axle driven dynamo adapted to be rotatably mounted on supports carried by a car truck, said cradle comprising a pair of loop-shaped hangers each adapted to straddle one of said supports, and a plurality of U-shaped bars, the said hangers having the lower portions thereof spaced apart so as to receive between them the adjacent ends of the said U-shaped bars, and means for rigidly connecting the bars to the said hangers.

In testimony whereof I affix my signature.

CHARLES H. QUINN.